US006201662B1

(12) United States Patent
Graves et al.

(10) Patent No.: US 6,201,662 B1
(45) Date of Patent: Mar. 13, 2001

(54) LATENT ILLUMINANCE DISCRIMINATION MARKER WITH REFLECTIVE LAYER FOR DATA STORAGE CARTRIDGES

(75) Inventors: Todd L. Graves, Garland; Klinton D. Washburn, Roy, both of UT (US)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/337,059

(22) Filed: Jun. 21, 1999

Related U.S. Application Data

(63) Continuation-in-part of application No. 09/161,007, filed on Sep. 25, 1998.

(51) Int. Cl.$^7$ .................................................. G11B 23/03
(52) U.S. Cl. .............................................. 360/133; 369/291
(58) Field of Search .............................. 360/133; 369/291

(56) References Cited

U.S. PATENT DOCUMENTS

| | | |
|---|---|---|
| 3,207,910 | 9/1965 | Hirschfeld et al. ................ 250/226 |
| 3,412,245 | 11/1968 | Halverson .............................. 250/71 |
| 3,444,517 | 5/1969 | Rabinow ........................... 340/146.3 |
| 3,468,046 | 9/1969 | Makishima .............................. 40/2.2 |
| 3,473,027 | 10/1969 | Freeman et al. ....................... 250/71 |
| 3,483,388 | 12/1969 | Ogle et al. ........................... 250/219 |
| 3,513,320 | 5/1970 | Weldon ................................ 250/219 |
| 3,522,432 | 8/1970 | Ortlieb .................................. 250/71 |
| 3,614,430 | 10/1971 | Berler ................................. 250/71 R |
| 3,654,463 | 4/1972 | Geusic et al. ..................... 250/71 R |
| 3,718,078 | 2/1973 | Plummer ............................. 359/742 |
| 3,738,299 | 6/1973 | Packler et al. ....................... 112/439 |
| 3,760,161 | 9/1973 | Lohne et al. ................. 235/61.11 E |
| 3,830,682 | 8/1974 | Rowland ................................ 161/2 |
| 3,894,164 | 7/1975 | Dismukes et al. ..................... 427/70 |
| 4,019,060 | 4/1977 | Woodman ....................... 250/461 R |

(List continued on next page.)

FOREIGN PATENT DOCUMENTS

| | | |
|---|---|---|
| 675172 A5 | 8/1990 | (CH) . |
| 2135059 | 1/1973 | (DE) . |
| 29 15 423 A1 | 10/1979 | (DE) . |
| 41 24 833 C2 | 9/1993 | (DE) . |

(List continued on next page.)

OTHER PUBLICATIONS

Ryer, A., *Light Measurement Handbook*, Index, http://www.intl-light.com/handbook, 1997–1998, 3 pages.

Ryer, A., "The Power of Light", *Light Measurement Handbook*, http://www.intl-light.com/handbook/ch02.html, 1997–1998, 4 pages.

Ryer, A., "Measurement Geometries", *Light Measurement Handbook*, http://www.intl-light.com/handbook/ch07.html, 1997–1998, 10 pages.

Internet pages regarding "irradiation", 1 page; "irradiance", 1 page; "radiant power", 1 page; "radiant energy", 1 page; "time", 1 page; "time scale", 1 page; and "Spectral Irradiance", 1 page.

(List continued on next page.)

*Primary Examiner*—William J Klimowicz
(74) *Attorney, Agent, or Firm*—Woodcock Washburn Kurtz Mackiewicz & Norris LLP

(57) ABSTRACT

A data storage cartridge for a data storage disk drive has a latent illuminance marker. A reflective surface on the cartridge increases the intensity of the irradiance on the marker and illuminance from the marker. A light source illuminates the marker and the marker emits phosphorescence. A photosensor detects the emitted illuminance, and the decay time is determined. The decay time is checked to provide identification of different types or generations of data storage cartridges or provides a secure keying mechanism for authorized access to proprietary software.

17 Claims, 5 Drawing Sheets

U.S. PATENT DOCUMENTS

| | | | |
|---|---|---|---|
| 4,047,033 | 9/1977 | Malmberg et al. | 250/341 |
| 4,058,732 | 11/1977 | Wieder | 250/461 B |
| 4,146,792 | 3/1979 | Stenzel et al. | 250/365 |
| 4,211,813 | 7/1980 | Gravisse et al. | 428/263 |
| 4,297,584 | 10/1981 | Buchanan et al. | 250/483 |
| 4,374,328 | 2/1983 | Tekippe et al. | 250/458.1 |
| 4,442,170 | 4/1984 | Kaule et al. | 428/333 |
| 4,451,521 | 5/1984 | Kaule et al. | 428/199 |
| 4,485,308 | 11/1984 | Rabatin | 250/461.1 |
| 4,533,244 | 8/1985 | Kaule et al. | 356/71 |
| 4,571,085 | 2/1986 | Anderson | 356/445 |
| 4,633,451 | 12/1986 | Ahn et al. | 369/14 |
| 4,650,320 | 3/1987 | Chapman et al. | 356/71 |
| 4,678,300 | 7/1987 | Beach | 354/21 |
| 4,791,310 | 12/1988 | Honig et al. | 250/458.1 |
| 4,839,092 | 6/1989 | Lindmayer | 252/301.4 S |
| 4,866,694 | 9/1989 | Korth | 369/110 |
| 4,908,516 | 3/1990 | West | 250/356 |
| 4,915,982 | 4/1990 | Lindmayer | 427/69 |
| 5,029,034 | 7/1991 | Weiley | 360/132 |
| 5,038,359 | 8/1991 | Pepper et al. | 359/529 |
| 5,042,020 | 8/1991 | Endo | 369/44.31 |
| 5,210,411 | 5/1993 | Oshima et al. | 250/271 |
| 5,220,166 | 6/1993 | Takeuchi et al. | 250/271 |
| 5,252,836 | 10/1993 | Matthews et al. | 250/571 |
| 5,270,854 | 12/1993 | Lee et al. | 359/359 |
| 5,289,451 | 2/1994 | Ashinuma et al. | 369/58 |
| 5,291,006 | 3/1994 | Nishiguma et al. | 235/454 |
| 5,325,243 | 6/1994 | Rath et al. | 360/71 |
| 5,329,127 | 7/1994 | Becker et al. | 250/459.1 |
| 5,351,268 | 9/1994 | Jensen et al. | 374/131 |
| 5,360,630 | 11/1994 | Thomas et al. | 427/67 |
| 5,414,266 | 5/1995 | Sun | 250/459.1 |
| 5,463,212 | 10/1995 | Oshima et al. | 235/468 |
| 5,471,281 | 11/1995 | Hayashi et al. | 155/201 |
| 5,491,586 | 2/1996 | Phillips | 359/529 |
| 5,495,466 | 2/1996 | Dohmeier et al. | 369/275.4 |
| 5,525,798 | 6/1996 | Berson et al. | 250/271 |
| 5,548,106 | 8/1996 | Liang et al. | 235/454 |
| 5,570,341 | 10/1996 | Sandell et al. | 369/291 |
| 5,576,110 | 11/1996 | Lin et al. | 428/447 |
| 5,604,006 | 2/1997 | Ponchaud et al. | 428/67 |
| 5,608,225 | 3/1997 | Kamimura et al. | 250/458.1 |
| 5,611,958 | 3/1997 | Takeuchi et al. | 252/301.4 P |
| 5,638,228 | 6/1997 | Thomas, III | 360/60 |
| 5,668,363 | 9/1997 | Nishida et al. | 235/468 |
| 5,745,460 | 4/1998 | Tateishi | 369/58 |
| 5,745,461 | 4/1998 | Kawasaki | 369/58 |
| 5,790,489 | 8/1998 | O'Connor | 369/52 |
| 5,809,520 | 9/1998 | Edwards et al. | |
| 5,841,230 | 11/1998 | Ikoma et al. | 313/506 |
| 5,986,838 * | 11/1999 | Thomas, III | 360/60 |
| 6,091,563 * | 7/2000 | Thomas, III et al. | 360/69 |

FOREIGN PATENT DOCUMENTS

| | | |
|---|---|---|
| 29 60 7075 U | 8/1996 | (DE) . |
| 195 25 677 C1 | 12/1996 | (DE) . |
| 0 203 752 A2 | 12/1986 | (EP) . |
| 0 210 629 * | 2/1987 | (EP) . |
| 0 716 102 A1 | 6/1996 | (EP) . |
| 0 802 499 A2 | 10/1997 | (EP) . |
| 1 232 570 | 5/1971 | (GB) . |
| 2018984 | 10/1979 | (GB) . |
| 4-61650 | 2/1992 | (JP) . |
| 4-167286 | 6/1992 | (JP) . |
| 6-18540 | 6/1994 | (JP) . |
| 9-213053 * | 8/1997 | (JP) . |
| WO 93/14422 | 7/1993 | (WO) . |
| WO 95/19605 | 7/1995 | (WO) . |
| WO 97/10307 | 3/1997 | (WO) . |
| WO 98/44504 | 10/1998 | (WO) . |

OTHER PUBLICATIONS

OTHER PUBLICATIONS

Kuchling, H., *Taschenbuch der Physik*, Verelag Harri Deutsch, 1979, 363–364.

Saleh, B.E. et al., *Fundamentals of Photonics*, John Wiley & Sons, Inc., 454–457.

Patent Abstracts of Japan, vol. 18(85), published Feb. 1994, Appl'n No. 4–113,999, Sugarawa.

Jacobs, S.F., "Experiments with retrodirective arrays", *Optical Engineering*, 1982, 21(2), 281–283.

Rennilson, J. "Retroreflection– What is it and how is it used?", *ASTM Standardization News*, Feb. 1982, 3 pages.

Venable, Jr. et al., "Factors affecting the metrology of retroreflecting materials", *Applied Optics*, 1980, 19(8), 1242–1246.

Walker, J. "The Amateur Scientist: Wonders with the retroreflector, a mirror that removes distortion from a light beam", *Scientific American*, 1988, 258(1), 118–123.

Reflexite Corporation Brochure NA1010, "Reflectors for Photoelectric Controls", Apr. 1993, 4 pages.

Lerner, J.S., Shie, R., Petersen, J., "Holographic Light Shaping Diffusers", presented at The Aerospace Lighting Institute, Advanced Seminar, Feb. 1994, Los Angeles, CA, 4 pages.

Physical Optics Corporation Brochure JL1–493, "Light Shaping Diffusers", 2 pages.

The Optometrics Group Catalog, "Optical Components & Instruments Catalog—Gratings", 1996, 28–35.

Kathman, A. et al., "Binary Optics: New Diffractive Elements for the Designer's Tool Kit", The Photonics Design & Applications Handbook®, Laurin Publishing Co., Inc., 1994 (Book 3), H358–H360.

Loewen, E.G., "Diffraction Gratings: Selection of Size and Type for Different Applications", The Photonics Design & Applications Handbook®, Laurin Publishing Co., Inc., 1994 (Book 3), H362–H365.

Faklis, D. et al., "Optical Design/Diffractive Lenses: Taking Advantage of Diffractive Optics to Reduce Size, Weight and Cost", The Photonics Design & Applications Handbook®, Laurin Publishing Co., Inc., 1994 (Book 3), H386–H390.

Lockyer et al., "Photonics vs. Counterfeiters", *Photonics Spectra*, Nov. 1996, 70–82.

* cited by examiner

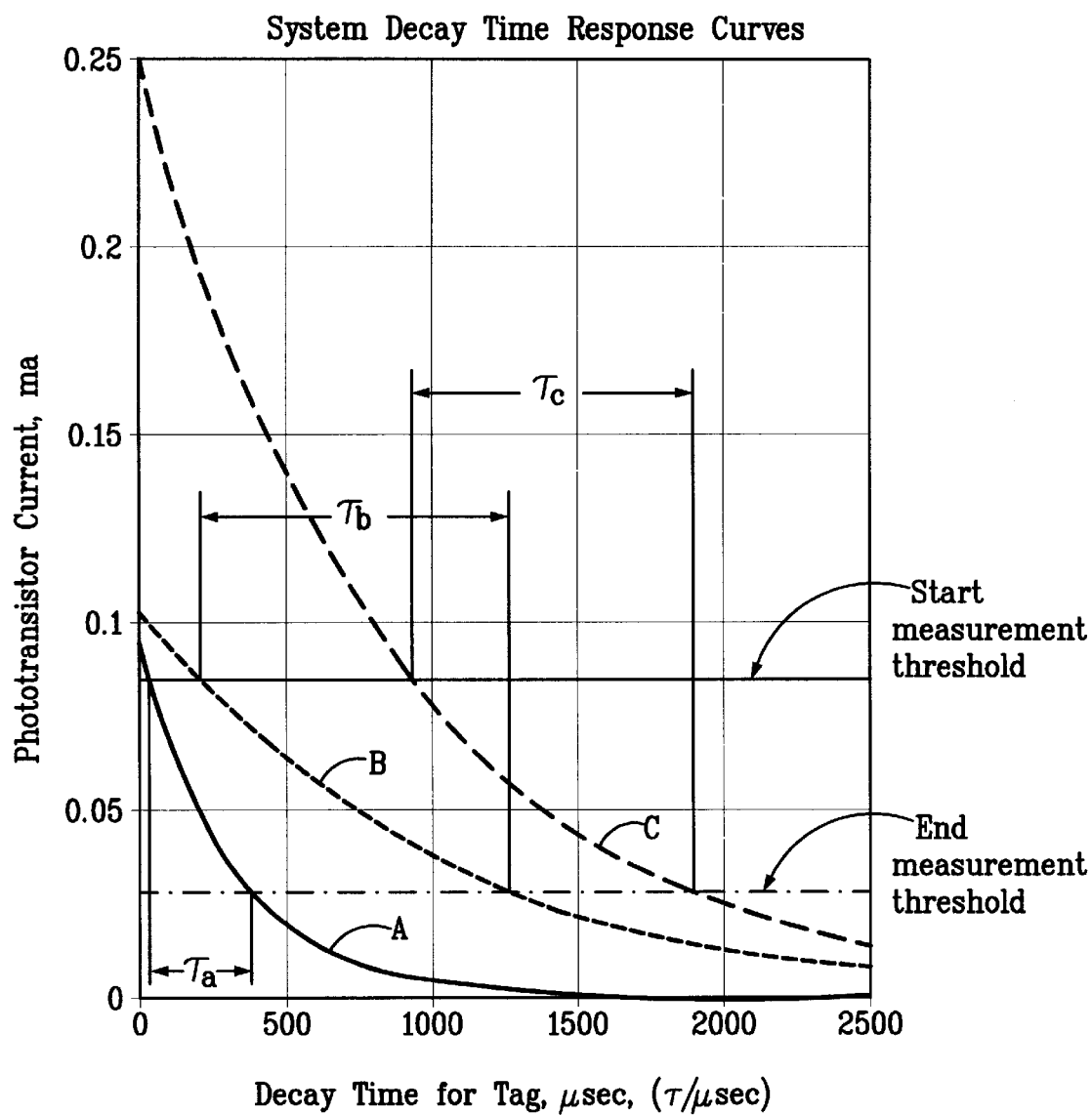

LATENT ILLUMINANCE DISCRIMINATION MARKER WITH REFLECTIVE LAYER FOR DATA STORAGE CARTRIDGES

This application is a continuation-in-part application of U.S. application Ser. No. 09/161,007, filed on Sep. 25, 1998 now pending.

FIELD OF THE INVENTION

The present invention relates in general to a system for identifying an object which includes marker, a source of irradiance, and a detector of light emitted from the marker. More particularly, the present invention relates to increasing the intensity of emitted light by disposing a reflective layer between the marker and the object.

BACKGROUND OF THE INVENTION

Disk drives for receiving removable disk cartridges, including conventional 3.5 inch floppy disk drives, must have some mechanism for detecting the insertion or presence of a disk cartridge in the drive. The actuator that carries the recording heads of the disk drive across the recording surfaces of the disk should not be allowed to move unless the presence of an appropriate disk cartridge which is non-drive damaging is detected. The removability feature requires that the disk drive have a cartridge insertion opening into which foreign objects can be inserted. If these objects physically engage the drive as a legitimate cartridge would, then the heads could be loaded onto or into the foreign object, thereby destroying the drive. Also, the spindle motor of the disk drive will be activated by a falsely detected foreign object, thereby generating particle debris. In the prior art, mechanical switches are typically employed to detect the presence of a disk cartridge within the drive. Such switches are typically positioned such that when a disk cartridge is inserted fully into the drive, the cartridge contacts the switch, thereby providing an indication that the disk cartridge is present.

"RETROREFLECTIVE MARKER FOR DATA STORAGE CARTRIDGE", U.S. Pat. No. 5,638,228, to Thomas, III, describes the reflection of a highly concentrated quasi circular lobe of light whose spread on reflection is captured by the aperture of a phototransistor in close proximity to a light emitting diode (LED). This emitter/detector pair is in the drive and a retroreflective array is on the cartridge. The desired light lobe size is provided by the geometric size of the retroreflector array elements relative to the spacing of the emitter and the detector in the drive. Due to this physical size matching and the fact that retroreflectors are used, this marker on the cartridge is quite insensitive to cartridge tilt and distance from the emitter/detector pair in the drive. This patent is incorporated herein by reference.

Recently, very small mini-cartridges have been developed for use in miniature disc drives. These mini-drives are incorporated into hand-held devices such as digital cameras, electronic books, global positioning systems, cellular phones and the like. "INTERCHANGEABLE CARTRIDGE DATA STORAGE SYSTEM FOR DEVICES PERFORMING DIVERSE FUNCTIONS", Ser. No. 08/746, 085, filed Nov. 6, 1996, Edwards, et al., now U.S Pat. No. 5,809,520, describes such mini-cartridges, mini-drives, and hand-held devices. This application is incorporated herein by reference.

As disk storage products become smaller and smaller, the need for a cartridge marker of thinner physical size is required. In very thin disk drives where the distance between the cartridge tag and the optical sensing device is very small (e.g., 1 mm), the inherent reflective gain mechanism obtained with a retroreflector over a diffuse or specular reflector is lost. Holographic directional light control is possible, but due to the very small working distances the ability for false engagement of the drive is significantly increased with that approach.

The ability to discriminate between cartridge types after insertion into a data storage device but prior to putting the read/write heads on the recording media is of significant value and utility. Principally this utility comes from the ability to detect the difference between various capacities or generations of data storage cartridges in a downward media compatible data storage drive. This discrimination capability allows for drive/media specific adjustments to be made such as media rotation rate, data channel rates, location of Z track for initial seeking, or even mechanical adjustment in the drive like the active engagement of new crash stop locations. The ability of a disk drive to predetermine the type/generation of data storage cartridge inserted into it prior to enabling the spin-up and engagement of read/write elements also provides the drive system designer with new possibilities for cross-platform interchangeability.

A "caddy" cartridge, as mentioned in the aforementioned Edwards, et al. application provides cross drive platform compatibility, for example between mini-cartridges and personal computer cartridges. The ability to recognize the installation of a "caddy" into the drive prior to spinning up of the "caddy" and loading of heads is necessary. Again rotational speed adjustments, Z track location information, data channel rate and crash stop/ID and OD data track location information must be determined prior to read/write head loading.

Another problem associated with the detection of LED light reflected from any reflective material is the occurrence of illuminance hot spots or structure in the LED output which often results in uneven illumination of the cartridge marker. Reflective cartridge markers can also become faded, scratched, or soiled. These factors combine to make the amplitude of the detected light signal highly variable.

Recently, in various industries, such as the distribution industry, phosphors have been used in the control of goods by means of bar codes, and furthermore, bar codes are printed on various prepaid cards and passing cards, and these bar codes are read by optical reading apparatuses such as scanners to perform the desired actions. Moreover, various attempts have been made to apply forgery preventive means to credit cards and prepaid cards or to detect forged cards. For example, the marks such as bar codes are printed with an ink containing a phosphor by offset printing or by using an ink ribbon to form latent image marks. The latent image marks are irradiated with a semiconductor laser beam to excite the phosphor and the light emitted from the phosphor is received to read the bar code information by an optical reading apparatus. These techniques use the content or spectral shift from the irradiating light source for identification.

Although the art of detecting and discriminating between data storage cartridges is well developed, there remain some problems inherent in this technology, particularly when the distance between the cartridge tag and the optical sensing device is between about 1 mm and about 15 mm. Therefore, a need exists for a tag that produces reliable detection and discrimination between data storage cartridges under varying gain and marker spacings.

Naturally occurring materials that emit signals, such as phosphors, can be used in identification schemes where it is important to ensure that only compatible devices are present. The emitted signal is usually quite faint and is typically amplified or increased in order for the identification scheme to perform robustly. Discrimination ratios (i.e., the ratio of the desired and the undesired signals) quantify how robustly the system operates. Amplifying the signal does not increase the discrimination ratio because all signals are amplified by the same amount. Therefore, increasing the output of the emissive material is the preferred way to increase the discrimination ratio or robustness of the system. Other methods of increasing light emissions include increasing the amount of material present and increasing the intensity of the light/energy source. These alternatives are not desirable because of the increased part and material cost.

It is an object of the present invention to increase the efficiency of the energy transfer between the light source and the emissive material and/or increase the quantity of emissions the sensor detects without increasing the amount of material present or increasing the intensity of the light source.

SUMMARY OF THE INVENTION

The present invention is directed to a cartridge for a data storage drive which has a source of irradiance at an irradiance wavelength and a detector of irradiance for determining whether the cartridge is suitable for use in the drive, comprising: a body; a data storage medium in the body; and a marker on the body, the marker being a latent illuminance material which receives irradiance from the source and emits irradiance having an initial intensity value toward the detector for detection which thereby identifies the cartridge as being suitable for use in that drive. In accordance with the invention, the intensity of the detected irradiance is increased by applying a reflective material or coating between the emissive material and the body. The reflective surface has a reflectivity at charging light wavelengths and at emitting light wavelengths. The charging light, if not absorbed by the emissive material, reflects at the reflective surface and gets a 'second chance' to be absorbed by the emissive material. The light emitted from the emissive material away from the sensor (detector) can be reflected by the reflective surface to the sensor. According to a further aspect of the present invention, the reflective surface could be comprised within the body itself. According to further aspects of the present invention, the reflective material could be along the edges of the marker (label) substrate. According to further aspects of the present invention, the output of the emissive material, as detected by the detector, could also be increased by placing the emissive material on a concave surface focused towards the detector.

The foregoing and other aspects of the present invention will become apparent from the following detailed description of the invention when considered in conjunction with the accompanying drawings.

BRIEF DESCRIPTION OF THE DRAWINGS

FIG. 3B is a diagram of exemplary decay rates for exemplary tag materials in accordance with the invention;

DESCRIPTION OF EXEMPLARY EMBODIMENTS AND BEST MODE

The present invention is directed to a latent illuminance marker (hereinafter also referred to as a tag) which is used to identify and discriminate the type of data storage cartridge (hereinafter also referred to as a disk cartridge) that has been inserted into a disk drive. The present invention provides an optical detection mechanism so that it can be ascertained with near certainty that an inserted object is an appropriate disk cartridge. The tag system is a highly effective discriminate of appropriate cartridge insertion for a disk drive and can also be used to prevent unauthorized copies of software from being easily reproduced and used in disk drives. One means of effecting this software protection is to make the latent illuminance tag alone or in conjunction with data on the storage media a key mechanism which is inserted in the data storage drive for operation of the software. It should be noted that the term "illuminance" as used herein includes, but is not limited to, irradiance and the spectrum of light including ultra-violet (UV), visible, and near infrared.

Figure 1:
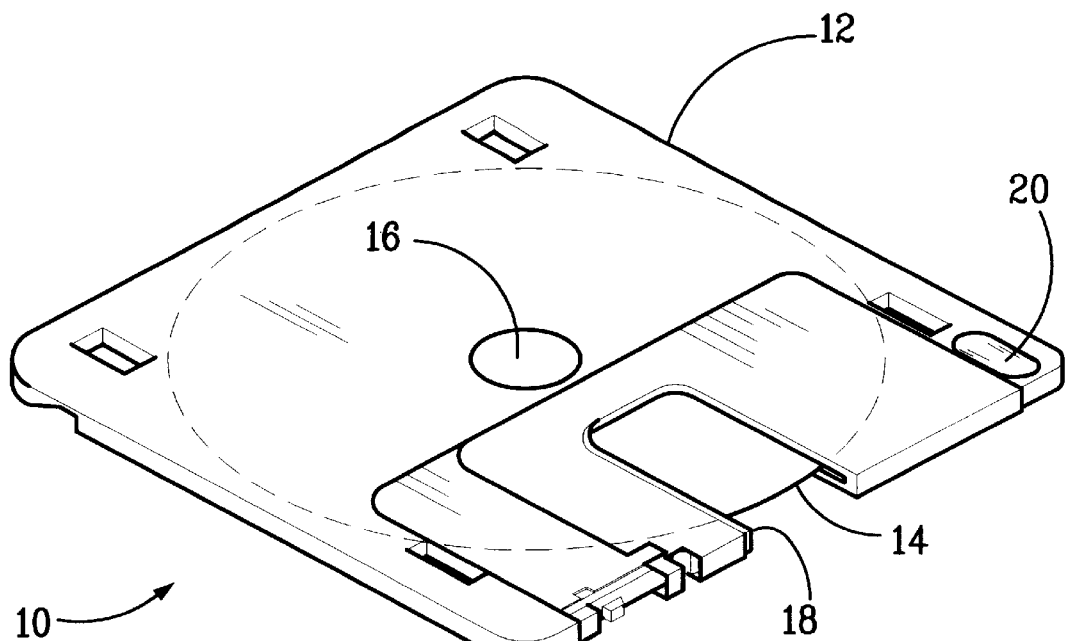
FIG. 1 shows an exemplary data storage cartridge of the present invention.
Figure 2:
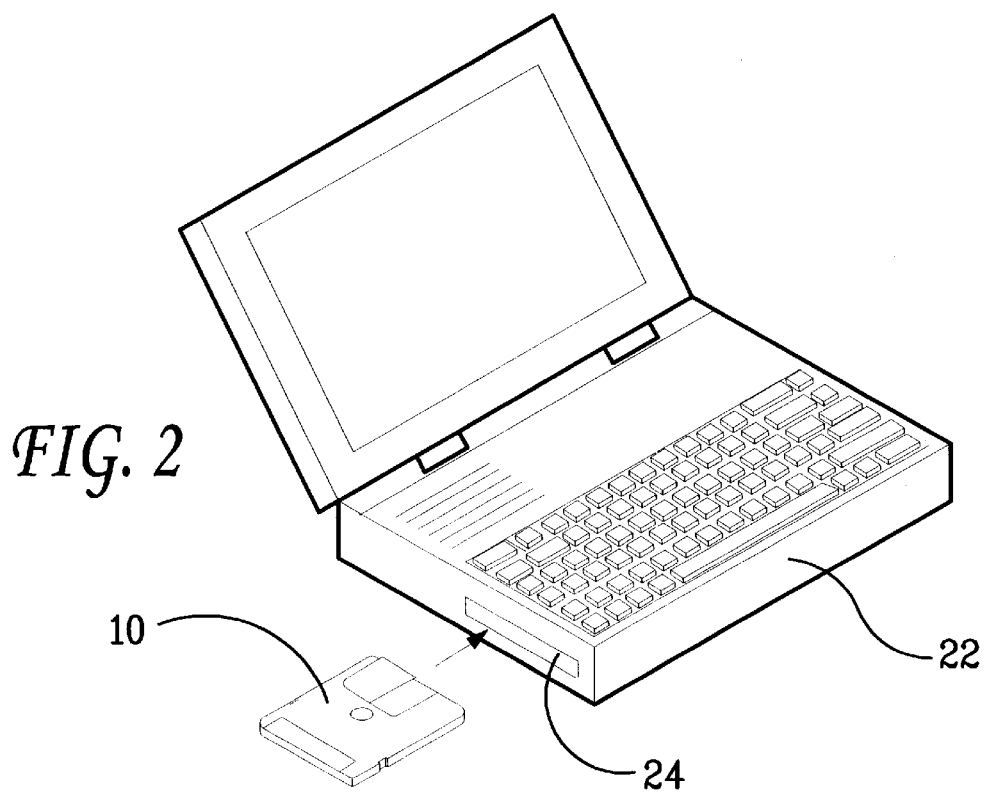
FIG. 2 is a perspective view of a device in which the invention is used.

FIGS. 1 and 2 show a cartridge and a disk drive to which the present invention is applicable. The cartridge and drive are described in the co-pending application entitled "INTERCHANGEABLE CARTRIDGE DATA STORAGE SYSTEM FOR DEVICES PERFORMING DIVERSE FUNCTIONS", Ser. No. 08/746,085, filed Nov. 6, 1996, now U.S. Pat. No. 5,809,520, which is incorporated herein by reference.

The disk cartridge 10 comprises an outer casing or body 12 and a disk-shaped recording medium 14 which is affixed to a hub 16 that is rotatably mounted in the casing 12 which is the base or substrate for the marker of the present invention. An opening on the bottom shell of the casing 12 provides access to the disk hub 16. A head access opening in the front peripheral edge 18 of the disk cartridge 10 provides access to the recording surfaces of the disk by the recording heads of a disk drive.

A latent illuminance marker, or tag, 20 is positioned on the disk cartridge 10 to be detected by a detector in a disk drive.

FIG. 2 shows a laptop computer 22 which has a disk drive 24 for receiving the disk cartridge 10 of FIG. 1. The drive 24 may be the Iomega ZIP™ drive which is disclosed and claimed in the U.S. patents identified in U.S. Pat. No. 5,638,228.

The latent illuminance marker 20 on the cartridge 10 is desirably very thin in order for the cartridge to fit in the thin form factor of the drive. Although any material exhibiting latent illuminant properties or characteristics can be used in accordance with the present invention, a phosphorescent material is used in a preferred embodiment of this invention. Materials of this type are often used for the detection of infrared radiation.

The present invention is directed to a latent illuminance tag, preferably phosphorescent, that can be attached to a data storage cartridge as a sticker, or printed into or applied via suspension in an adhesive compound such as a UV curable epoxy onto a data storage cartridge. On each disk cartridge having an authorized copy of the software, there is a tag which is preferably coated with a phosphorescent photoluminent material which serves to identify the type or generation of disk cartridge and distinguish it from other types of disk cartridges and purely passive light reflectors.

Figure 3A:
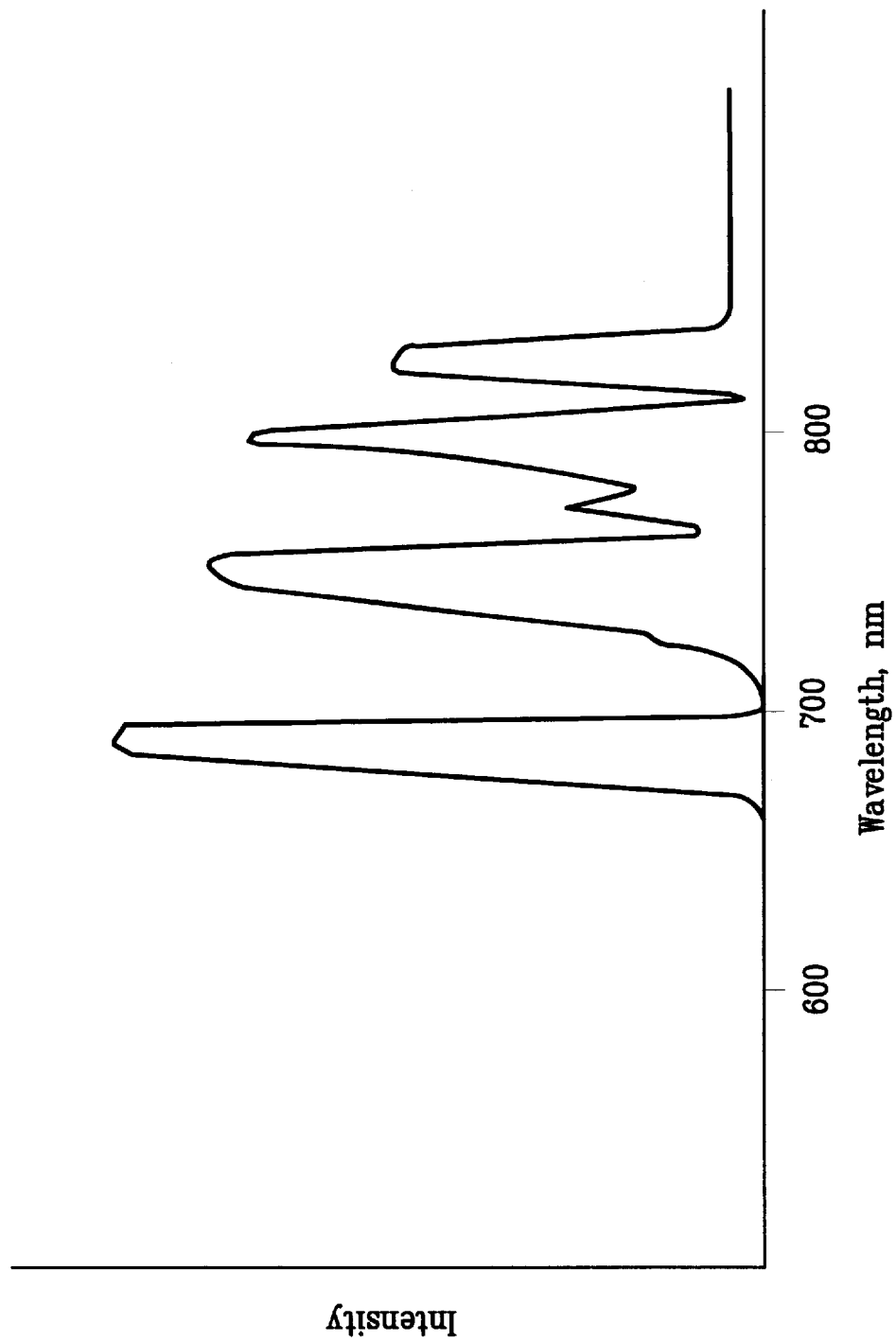
FIG. 3A is an exemplary latent illuminance output spectrum for a tag in accordance with the present invention.

The phosphor type materials used in the phosphorescent tag fluoresce for a period of time after a light source, preferably an LED, that has illuminated the tag is turned off. The LED strikes the tag at an excitation wavelength and the light emitted from the tag has a wavelength (or wavelengths) that is shifted from the excitation wavelength. The wavelength(s) can be shorter or longer than the excitation wavelength. As described above, the light emission from the tag is called phosphorescence. An exemplary latent illuminance output spectrum for a tag in accordance with the present invention is shown in FIG. 3A. The output spectrum is characteristic of the material that comprises the tag. The intensity of the illuminance (light) emitted at at least one of the wavelengths (e.g., about 680 nm) can be monitored to measure a decay time, as described below.

Preferably, the latent illuminance material is excited with light close to a single wavelength (e.g., about 660 nm). The latent irradiance emitted by the latent illuminance material can be at a single wavelength, or at a spectrum of wavelengths (e.g., between about 680 and about 800 nm). In the latter case, the signal used to determine the decay period (hereinafter also referred to as a decay time or time constant) is measured as the aggregate of the spectrum of wavelengths being detected by the sensor.

The tag will emit illuminance (light) in accordance with the output spectrum for a period of time after being illuminated with a light source. The decay time for the emitted illuminance ranges from sub-microseconds to several minutes, and preferably between about 50 $\mu$sec and about 3,000 $\mu$sec, depending on the material that is phosphorescing and the wavelengths that are being monitored. A decay time constant used to specify the tag is the time it takes for the latent irradiance to decay to some fraction or percentage, such as 37%, of its initial value. In accordance with a preferred embodiment, the decay in irradiance takes the form $e^{-t/(T/X)}$ where T is the decay time constant for a predetermined amount of decay, X is a predetermined constant that preferably ranges between about 0.36 and about 2.3, and t is elapsed time from when the charging LED is turned off, or the elapsed time for the decaying signal level to pass from a first predetermined magnitude or intensity level through a second lower level which fixed and predetermined, and is preferably a predetermined percentage below the first magnitude level, but can be a predetermined percentage below the initial value. For example, for a decay of about 30% of the initial latent illuminance, X is about 0.36. FIG. 3B illustrates this decay for three different exemplary tag materials, A, B, and C, as a graph of phototransistor current versus decay time for the tag. As described below, a phototransistor or photodiode are the preferred detectors used to detect the emitted illuminance from a tag.

Figure 3C:
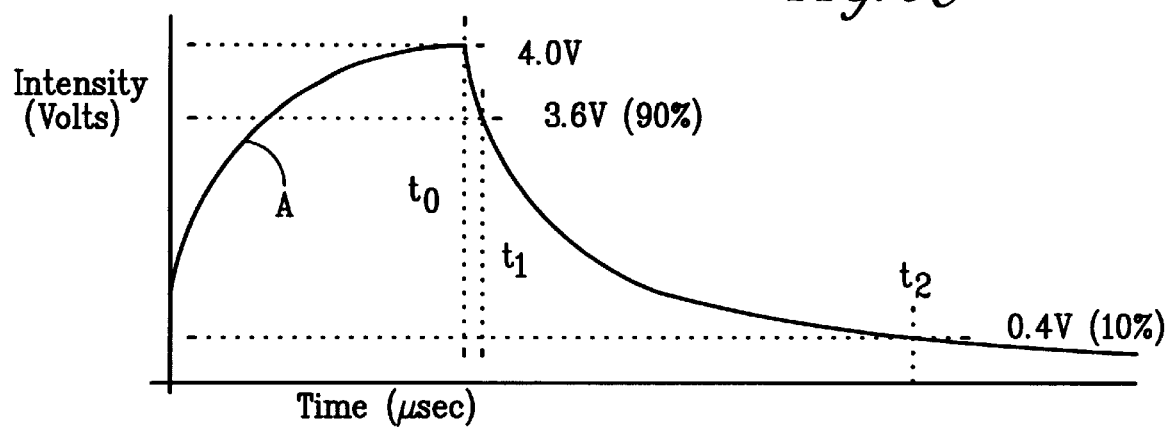
FIG. 3C is an exemplary decay pattern for a tag in accordance with the present invention.

FIG. 3C shows an exemplary decay pattern for a tag in accordance with the present invention. The intensity is measured for a predetermined wavelength. As the tag is being illuminated (charged) by the LED light source, it begins to emit illuminance, as indicated by line A. The LED light source is turned off at time to, and the tag thereafter emits latent illuminance from an initial peak value, such as about 4.0 volts, to a low value, ultimately approaching about 0 volts. The decay time is measured between two or more thresholds, such as between 90% and 10% of the initial value; i.e., the time between about 3.6 volts and 0.4 volts, or $t_2-t_1$. This decay from the initial 3.6 volt threshold level to a 0.4 volt threshold level illustrates an embodiment where about an 89% decay time is measured (100*(3.6−0.4)/3.6). The measured decay time is compared with a predetermined decay time to determine whether or not the data storage cartridge or disk that has been inserted in the disk drive is appropriate for use with the disk drive. If so, the read/write heads of the disk drive are then able to engage the disk without risk of damage. Moreover, the data storage cartridge can be identified as a particular type or generation, and the disk drive can engage it accordingly. Although the preferred embodiment is directed to an exponential decaying latent illuminance material, it is also appreciated that non-exponential optically decaying latent illuminance materials can also be used with the present invention.

In a preferred embodiment, the system measures the latent illuminance times between two pairs of thresholds in order to ensure greater accuracy in authentication and validation and to eliminate a linear response that emulates the exponential decay. Each pair of thresholds is preferably the same percentage decrease in intensity. In one example, a first pair of thresholds is 90% and 60%, or the time it takes the latent illuminance intensity to decrease from 90% to 60%, which is a decrease in intensity of 33% or one-third. The second exemplary pair of thresholds is 60% and 40%, which is also a decrease in intensity of 33% or one-third. The irradiant decay is timed between the first and second thresholds, and the second and third thresholds. The time it takes for the illuminance to decrease between the first set of thresholds should be approximately equal to the time it takes the illuminance to decrease between the second set of thresholds because the percentage decrease in intensity is the same between the two pairs of thresholds. With an exponential decay, the times are approximately equal. If these two times are approximately equal, then it is known that the detected light is being emitted from something having a decay time similar to the authentic tag. For further validation purposes, the time can be compared to a predetermined time to further ensure that the tag is authentic or valid. Thus, a means for verifying that the decay rate being measured is truly of exponential form and not linear is provided.

Figure 4A:
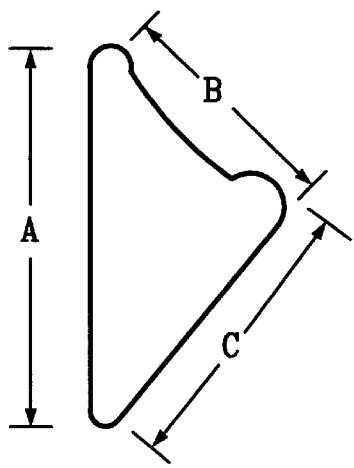
FIGS. 4A and 4B show a plan view and a cross section, respectively, of one exemplary embodiment of the invention.
Figure 4B:
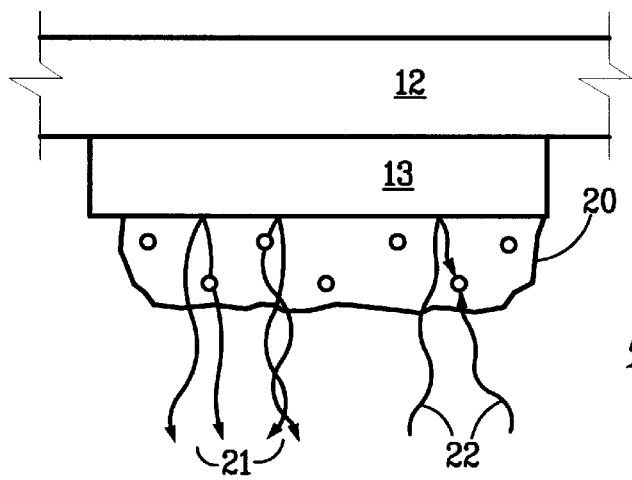

The tag can be any size or shape that fits on the disk cartridge, with the thickness, or ink thickness if printed, preferably less than about 0.5 mm and a thickness tolerance of about ±0.05 mm. FIG. 4A shows the preferred physical dimensions of the tag implementation for a cartridge application, with dimensions: A equals approximately 1.2 cm, B equals approximately 0.9 cm, and C equals approximately 1.0 cm. The sheet tolerance for the tag illustrated in FIG. 4A is about ±0.13 mm. FIG. 4B shows an exploded perspective view of the reflective surface 13 disposed between the emissive material of the marker 20 and the casing 12 of the disk cartridge. The charging light 22, if not absorbed by the marker 20, reflects at the reflective surface 13 and gets a second chance to be absorbed by the emissive material of the marker 20, thereby increasing the charging of the emissive material of the marker.

In accordance with the present invention, the light 21 emitted from the emissive material 20 away from the sensor or detector is reflected by the reflective surface 13 to the sensor to increase the amount of emitted light detected by the detector.

In one exemplary embodiment, the outer casing 12 of the disk cartridge embodies the reflective surface 13 and is made of white ABS plastic, thereby alleviating the need to apply a separate reflective coating 13 to the casing 12 of the disk cartridge.

Preferably, the reflective surface 13 is a reflective material or coating applied between the marker 20 and its base or substrate (e.g., the casing 12 of the disk cartridge). The surface reflects the energy that passes through or is reflected off the marker 20 without charging any particles. The reflective surface 13 directs the light 22 back to the marker 20 to charge its emissive material from the back side. The reflective surface 13 also reflects any emissions 21 that originate from the back side of the marker 20 and directs them back to the sensor.

Figures 5, 6:
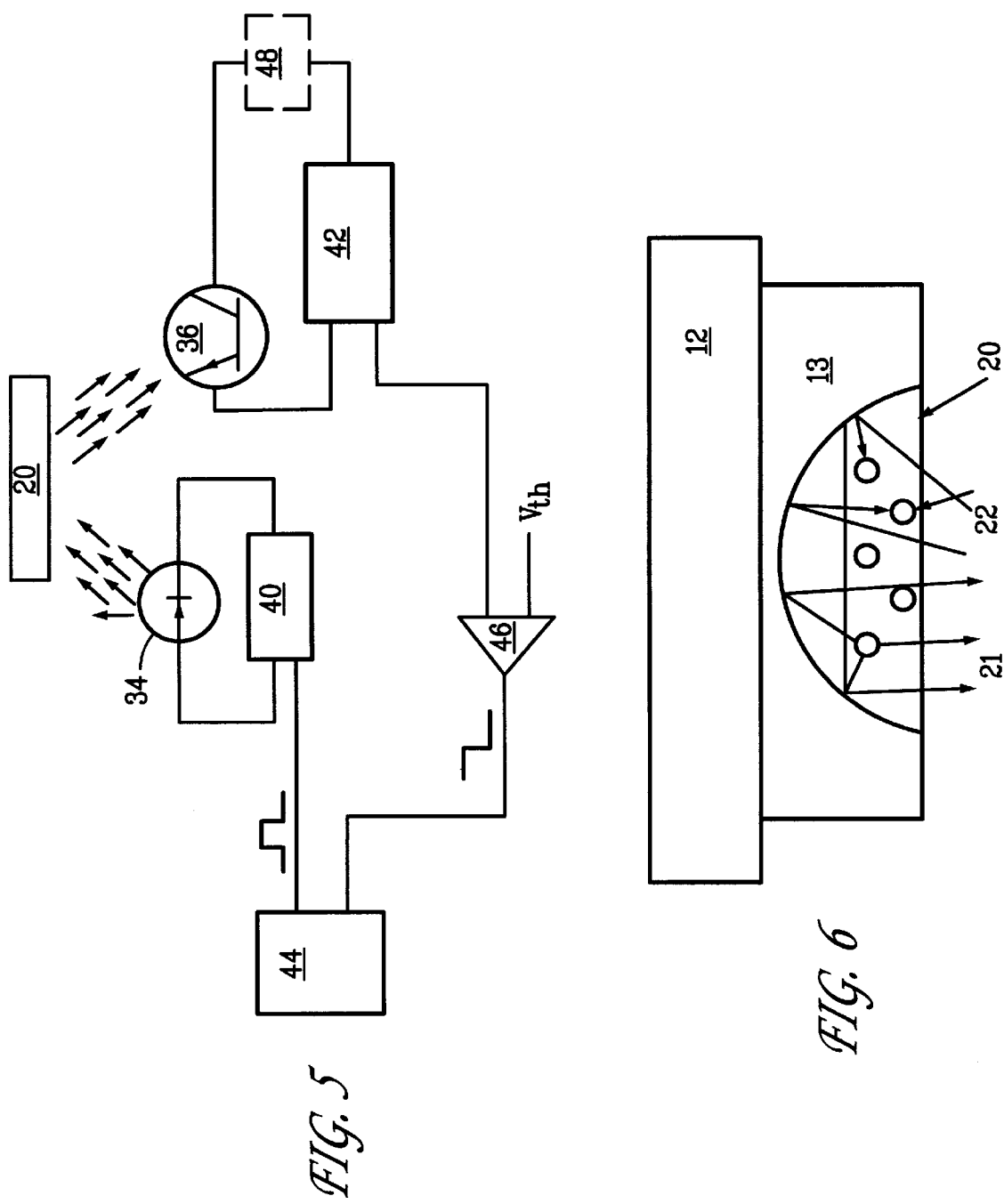
FIG. 5 shows a block diagram of an exemplary system in accordance with the present invention.
FIG. 6 shows a cross section of another exemplary embodiment of the invention with a concave reflector surface.

In an exemplary embodiment, illustrated in FIG. 6, the reflective surface 13 is concave to better direct light 22 back to the emissive material of the marker 20 and better reflect any emissions 21 that originate from the back or sides of the marker 20 toward the sensor.

FIG. 5 shows a block diagram of an exemplary system in accordance with the present invention. A light source 34, preferably an LED, illuminates a latent illuminance tag or marker 20 and is then turned off. The LED 34 is driven by LED switching and current limiting electronics 40, and a microprocessor 44 which sends pulse commands to the electronics 40. The tag 20 emits illuminance, having an initial intensity value at a particular wavelength or wavelengths, which is detected by a detector 36, preferably a phototransistor or photodiode. Preferably, the detector 36 waits a predetermined time, such as about 10 $\mu$sec, after the LED is turned off before beginning measurement of the latent illuminance at the particular wavelength(s) from the tag. Gain, preferably 100×, is applied to the output of the phototransistor or photodiode 36 by a gain stage 42. The output of the gain stage 42 is provided to a comparator 46 which compares the emitted illuminance with a threshold Vth. The results of the comparison are provided to the microprocessor 44 which measures the timing, determines the decay rate or time, and identifies the disk cartridge for validation, as described above. Element 48 contains optional filters.

More particularly, when a data storage cartridge is inserted into a disk drive, the light source 34, preferably an LED, emits a short intense pulse of light. The light can be one pulse or a continuous cycle of pulses. Moreover, in another exemplary embodiment, the detection circuitry optically pumps the phosphorescent tag with the light source and measures and compares a phase lag between the drive signal and the decay illuminance. This provides a measure of the decay time constant.

LEDs are capable of handling large current surges for short periods to generate bright flashes of light. The outputted LED light illuminates the latent illuminance tag 20 and thereby excites atoms or ions which emit light as they decay to lower energy levels. The phosphor type materials used in the preferred latent illuminance tag 20 fluoresce for a period of time after the LED 34 is turned off. The photonic sensor 36 is in close proximity to the LED 34. This sensor 36 is initially saturated by the emitted light from the tag 20, preferably significantly above the high detection threshold level such that component life and manufacturing tolerances are accommodated (i.e., do not significantly affect the performance of the device). Once the LED 34 is turned off, the disk drive microprocessor 44 or a functionally similar system monitors the output of the photonic sensor 36 and, in an exemplary embodiment, determines the decay time required for the latent illuminance or phosphorescence to fall through two predetermined thresholds, thus establishing the desired decay rate. The decay time measured by the drive microprocessor 44 provides information by which the drive can determine which generation or type of cartridge has been inserted. It is noted that alternate embodiments establish a decay rate to identify the cartridge based on the time required for the latent illuminance or phosphorescence to fall below a predetermined threshold, or fall through multiple thresholds, such as two sets of two predetermined thresholds.

The thresholds are preferably fixed, predetermined values, but it is understood that the microprocessor could measure the initial intensity value of the latent illuminance and, based on the initial value, determine the thresholds and expected decay times. Moreover, the thresholds could be fixed intensity values (e.g., about 3.0 volts and about 1.0 volts) determined independently, and not determined responsive to a percentage of the initial value or any other threshold.

While particular embodiments have been shown and described various modifications may be made. The appended claims are, therefore, intended to cover all embodiments within the true spirit and scope of the invention.

What is claimed:

1. A cartridge for a data storage drive which has a source of irradiance at an irradiance wavelength and a detector of irradiance for determining whether the cartridge is suitable for use in said drive, comprising:

a body;

a data storage medium in said body;

a marker formed of a latent illuminance material on said body that receives irradiance from said source and emits irradiance having an initial intensity value toward said detector for detection which thereby identifies said cartridge as being suitable for use in that drive; and a reflective surface disposed between said marker and said body, said reflective surface increasing the intensity of said irradiance detected by said detector.

2. The cartridge of claim 1, wherein said body comprises illuminance reflective plastic and comprises said reflective surface.

3. The cartridge of claim 2, wherein said body comprises white ABS plastic.

4. The cartridge of claim 1, wherein said reflective surface has a substantially concave shape.

5. The cartridge of claim 4, wherein said latent illuminance material is disposed within said substantially concave shape of said reflective surface.

6. The cartridge of claim 1, wherein said marker has a latent illuminance wavelength spectrum in the range between about 450 nm and about 1050 nm.

7. The cartridge of claim 6, wherein said marker has a latent illuminance wavelength spectrum in the range between about 680 nm and about 800 nm.

8. The cartridge of claim 6, wherein said irradiance wavelength is outside of said latent illuminance wavelength spectrum.

9. The cartridge of claim 1, wherein said latent illuminance material comprises a phosphorescent material.

10. The cartridge of claim 1, wherein said latent illuminance material has a decay time which is used to identify said cartridge.

11. The cartridge of claim 10, wherein said decay time is in the range between about 50 $\mu$sec and about 3,000 $\mu$sec.

12. The cartridge of claim 10, wherein said decay time is an amount of time for said irradiance from said marker to decay to a predetermined percentage of said initial intensity value.

13. The cartridge of claim 10, wherein said decay time is an amount of time it takes said irradiance from said marker to decay from a first predetermined percentage of said initial intensity value to a second predetermined percentage of said initial intensity value.

14. The cartridge of claim 10, wherein said decay time is an amount of time it takes said irradiance from said marker to decay from a first intensity value to a predetermined percentage of said initial intensity value.

15. The cartridge of claim 1, wherein said irradiance from said marker has an intensity that decays one of exponentially and as the sum of a plurality of differently weighted exponential decays.

16. The cartridge of claim 15, wherein said intensity of said irradiance decays according to $e^{-(t/(T/X))}$, where T is a decay time constant for a predetermined amount of decay, X is a predetermined constant, and t is a time that has elapsed from when said source of irradiance stops providing said irradiance.

17. A cartridge for a data storage drive which has a source of irradiance at an irradiance wavelength and a detector of irradiance for determining whether the cartridge is suitable for use in said drive, comprising:

a body;

a data storage medium in said body;

a marker formed of a latent illuminance material on said body that receives irradiance from said source and emits irradiance having a sufficient intensity value toward said detector for detection and identification of said cartridge as being suitable for use in that drive; and a reflective surface disposed between said marker and said body that redirects irradiance from said source to said marker and directs emitted irradiance from said marker to said detector, thereby increasing the intensity of said irradiance detected by said detector.

* * * * *